United States Patent
Biswas et al.

(10) Patent No.: US 9,396,122 B2
(45) Date of Patent: Jul. 19, 2016

(54) CACHE ALLOCATION SCHEME OPTIMIZED FOR BROWSING APPLICATIONS

(71) Applicant: Apple Inc., Cupertino, CA (US)

(72) Inventors: Sukalpa Biswas, Fremont, CA (US); Wolfgang H. Klingauf, San Jose, CA (US); Rong Zhang Hu, Saratoga, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 13/866,282

(22) Filed: Apr. 19, 2013

(65) Prior Publication Data
US 2014/0317355 A1    Oct. 23, 2014

(51) Int. Cl.
*G06F 12/00* (2006.01)
*G06F 12/08* (2016.01)
*G06F 12/12* (2016.01)
(Continued)

(52) U.S. Cl.
CPC .......... *G06F 12/0871* (2013.01); *G06F 1/3218* (2013.01); *G06F 1/3275* (2013.01); *G06F 12/0864* (2013.01); *G06F 12/0893* (2013.01); *G06F 12/122* (2013.01); *G09G 5/395* (2013.01); *G06F 2212/1028* (2013.01); *G06F 2212/171* (2013.01); *G06F 2212/6046* (2013.01); *G09G 2330/021* (2013.01); *G09G 2330/022* (2013.01); *G09G 2360/121* (2013.01); *Y02B 60/1225* (2013.01); *Y02B 60/1228* (2013.01)

(58) Field of Classification Search
CPC ... G06F 1/32; G06F 12/08; G06F 2212/1028; G06F 2212/6046; G09G 5/395; G09G 2330/02; G09G 2360/121

USPC .......................................... 711/128; 713/323
See application file for complete search history.

(56) References Cited

U.S. PATENT DOCUMENTS 5,512,921 A    4/1996  Mital et al.
5,715,426 A    2/1998  Takahashi et al.
(Continued)

FOREIGN PATENT DOCUMENTS

TW       I323842 B      4/2010
TW     201033919 A      9/2010
TW     201250695 A     12/2012

OTHER PUBLICATIONS

Ke Meng and Russ Joseph, "Process Variation Aware Cache Leakage Management", Oct. 4-6, 2006 Proceedings of the 2006 international symposium on Low power electronics and design (ISLPED '06) ACM, New York, NY, USA; pp. 262-267.

(Continued)

*Primary Examiner* — Charles Rones
*Assistant Examiner* — Nanci Wong
(74) *Attorney, Agent, or Firm* — Rory D. Rankin; Meyertons, Hood, Kivlin, Kowert & Goetzel, P.C.

(57) ABSTRACT

Methods and systems for cache allocation schemes optimized for browsing applications. A memory controller includes a memory cache for reducing the number of requests that access off-chip memory. When an idle screen use case is detected, the frame buffer is allocated to the memory cache using a sequential allocation mode. Pixels are allocated to indexes of a given way in a sequential fashion, and then each way is accessed in a sequential fashion. When a given way is being accessed, the other ways of the memory cache are put into retention mode to reduce the leakage power.

20 Claims, 10 Drawing Sheets

(51) Int. Cl.
*G06F 1/32* (2006.01)
*G09G 5/395* (2006.01)

(56) References Cited

U.S. PATENT DOCUMENTS

| | | | |
|---|---|---|---|
| 5,761,715 | A | 6/1998 | Takahashi |
| 5,961,617 | A | 10/1999 | Tsang |
| 6,799,250 | B2 | 9/2004 | Hamaya |
| 6,848,024 | B1 | 1/2005 | Rowlands et al. |
| 6,944,714 | B2 | 9/2005 | Lesarte et al. |
| 7,042,461 | B2 | 5/2006 | Cui |
| 7,043,647 | B2 | 5/2006 | Hansen et al. |
| 7,127,560 | B2 | 10/2006 | Cohen et al. |
| 7,152,187 | B2 | 12/2006 | Tran et al. |
| 7,430,642 | B2 | 9/2008 | Moyer |
| 7,437,513 | B2 | 10/2008 | Saida et al. |
| 7,472,302 | B2 | 12/2008 | Hu et al. |
| 7,502,887 | B2 | 3/2009 | Tanaka et al. |
| 7,636,812 | B2 | 12/2009 | Kaneko |
| 7,853,817 | B2 | 12/2010 | Yarak |
| 7,904,658 | B2 | 3/2011 | Abadeer et al. |
| 8,103,894 | B2 | 1/2012 | Balakrishnan et al. |
| 8,156,357 | B2 | 4/2012 | Zhang et al. |
| 8,285,936 | B2 | 10/2012 | Roberts et al. |
| 8,335,122 | B2 | 12/2012 | Dreslinski, Jr. et al. |
| 8,412,971 | B2 | 4/2013 | Branover et al. |
| 8,832,485 | B2 | 9/2014 | Branover et al. |
| 2002/0156978 | A1 | 10/2002 | Hamaya |
| 2003/0156472 | A1 | 8/2003 | Satou et al. |
| 2004/0024968 | A1 | 2/2004 | Lesartre et al. |
| 2004/0225842 | A1 | 11/2004 | Rowlands et al. |
| 2005/0086435 | A1 | 4/2005 | Todoroki |
| 2005/0246499 | A1 | 11/2005 | Saida et al. |
| 2006/0143382 | A1* | 6/2006 | Damaraju et al. ............ 711/118 |
| 2007/0043965 | A1 | 2/2007 | Mandelblat et al. |
| 2007/0124538 | A1 | 5/2007 | Abadeer et al. |
| 2007/0136530 | A1 | 6/2007 | Tanaka |
| 2007/0186057 | A1* | 8/2007 | Moll et al. .................... 711/146 |
| 2007/0288776 | A1 | 12/2007 | DeMent et al. |
| 2008/0040547 | A1 | 2/2008 | Abadeer et al. |
| 2008/0100636 | A1 | 5/2008 | Lai et al. |
| 2008/0143695 | A1 | 6/2008 | Juenemann et al. |
| 2008/0244181 | A1 | 10/2008 | Walz et al. |
| 2008/0313482 | A1 | 12/2008 | Karlapalem et al. |
| 2009/0119487 | A1 | 5/2009 | Hosoda |
| 2009/0235028 | A1 | 9/2009 | Kaneko |
| 2010/0122100 | A1 | 5/2010 | Strumper |
| 2010/0123727 | A1 | 5/2010 | Kwa et al. |
| 2010/0191990 | A1 | 7/2010 | Zhang et al. |
| 2010/0228637 | A1 | 9/2010 | Ghosh et al. |
| 2011/0153928 | A1 | 6/2011 | Avudaiyappan et al. |
| 2011/0208916 | A1 | 8/2011 | Saito |
| 2011/0238919 | A1* | 9/2011 | Gibson et al. ................ 711/133 |
| 2011/0252251 | A1 | 10/2011 | de Cesare et al. |
| 2011/0283124 | A1 | 11/2011 | Branover et al. |
| 2012/0159074 | A1 | 6/2012 | Sodhi et al. |
| 2012/0188262 | A1 | 7/2012 | Rabii |
| 2012/0303897 | A1 | 11/2012 | Pullagoundapatti et al. |
| 2012/0314833 | A1 | 12/2012 | Venkatasubramanian et al. |
| 2012/0324145 | A1 | 12/2012 | Teo |
| 2013/0036270 | A1 | 2/2013 | Dreslinski et al. |
| 2013/0080813 | A1 | 3/2013 | Tarui et al. |
| 2013/0111121 | A1 | 5/2013 | Ananthakrishnan et al. |
| 2013/0246818 | A1 | 9/2013 | Nomura et al. |
| 2014/0052922 | A1 | 2/2014 | Moyer et al. |
| 2014/0089590 | A1 | 3/2014 | Biswas et al. |
| 2014/0173207 | A1 | 6/2014 | Wang et al. |
| 2014/0181407 | A1 | 6/2014 | Crum et al. |
| 2014/0181410 | A1 | 6/2014 | Kalamatianos et al. |

OTHER PUBLICATIONS

Albonesi, D.H., "Selective Cache Ways: On-Demand Cache Resource Allocation", May 2000, Journal of Instruction-Level Parallelism 2 (2000) 1-6; pp. 1-22.
U.S. Appl. No. 13/855,174, filed Apr. 2, 2013, entitled "Advanced Course-Grained Cache Power Management," inventors Shinye Shiu, Sukalpa Biswas, Wolfgang H. Klingauf, and Rong Zhang Hu.
U.S. Appl. No. 13/629,563, filed Sep. 27, 2012, entitled "System Cache with Coarse Grain Power Management," inventors Sukalpa Biswas, Shinye Shiu, and Rong Zhang Hu.
U.S. Appl. No. 13/855,189, filed Apr. 2, 2013, entitled "Advanced Fine-Grained Cache Power Management," inventors Wolfgang H. Klingauf, Rong Zhang Hu, Sukalpa Biswas, and Shinye Shiu.
International Search Report and Written Opinion from PCT/US2014/031699, mailed Aug. 4, 2014, Apple Inc., pp. 1-12.
"Drowsy Caches: Simple Techniques for Reducing Leakage Power", Krisztian Flautner, et al., May 25, 2002, pp. 148-157.
Han et al.; "Using Checksum to Reduce Power Consumption of Display Systems for Low-Motion Content;" Proc. IEEE International Conference on Computer Design, Oct. 4-7, 2009, Lake Tahoe, CA; pp. 47-53.
U.S. Appl. No. 13/850,548, filed Mar. 26, 2013, entitled "Compressed Frame Writeback and Read for Display in Idle Screen on Case," inventors Brijesh Tripathi, Peter Holland, and Albert Kuo.
U.S. Appl. No. 13/890,306, filed May 9, 2013, entitled "Memory Power Savings in Idle Display Case," inventors Sukalpa Biswas, Shinye Shiu, Cyril de la Cropte de Chanterac, Manu Gulati, Pulkit Desai, and Rong Zhang Hu.
U.S. Appl. No. 13/850,565, filed Mar. 26, 2013, entitled "Mechanism to Detect Idle Screen On," inventors Brijesh Tripathi, Peter Holland, and Albert Kuo.
International Search Report and Written Opinion from PCT/US2014/032811, mailed Jun. 30, 2014, Apple Inc., pp. 1-8.
Non-Final Office Action in U.S. Appl. No. 13/629,563, mailed Sep. 17, 2014, 18 pages.
Final Office Action in U.S. Appl. No. 13/629,563, mailed Mar. 25, 2015, 16 pages.
Notice of Allowance in U.S. Appl. No. 13/855,174, mailed Nov. 7, 2014, 11 pages.
Office Action in Taiwan Patent Application No. 103113581, mailed May 19, 2015, 15 pages.
Office Action in Taiwan Patent Application No. 103113581, mailed Aug. 28, 2015, 17 pages.
Office Action in Taiwan Patent Application No. 103114566, mailed Sep. 23, 2015, 6 pages.
Non-Final Office Action in U.S. Appl. No. 13/855,189, mailed Aug. 26, 2015, 18 pages.
Non-Final Office Action in U.S. Appl. No. 13/890,306, mailed May 6, 2015, 9 pages.

* cited by examiner

CACHE ALLOCATION SCHEME OPTIMIZED FOR BROWSING APPLICATIONS

BACKGROUND

1. Field of the Invention

The present invention relates generally to data caches, and in particular to methods and mechanisms for utilizing a memory cache located in a memory controller for browsing applications in mobile electronic devices.

2. Description of the Related Art

Modern day mobile electronic devices often include multiple components or agents sharing access to one or more memory devices. These multiple agents may make large numbers of requests to memory, and as the number of these requests increases, the power consumption of the device increases, which limits the battery life of the device. One approach for reducing power consumption is to try to reduce the number of times that off-chip memory is accessed by caching data in or near the processor.

For commonly recurring tasks, the display of a mobile electronic device may be static for a considerable length of time. For example, the device may be used in an internet browsing application with the user looking at various web pages. After a given web page has been downloaded and displayed on the screen, the user may stay at this given web page, with the device screen not changing, for a considerable length of time. This type of browsing activity can be quite prevalent for many users of mobile electronic devices.

For a typical mobile electronic device, the display may be driven from a frame buffer stored in memory. The frame buffer may include pixels with a one-to-one mapping to the dimensions of the display, and the frame buffer may be written to the display a fixed number of times per second. For example, in one embodiment, the frame buffer may be written to the display 60 times per second. Various graphics processors and/or logic may be used to generate the individual frames which are stored in the frame buffer. However, when the display content is not changing, retrieving the frame buffer from memory 60 times per second to drive the display is a power intensive activity.

SUMMARY

Systems, memory controllers, caches, and methods for optimizing browsing applications using a memory cache are disclosed.

In a system on chip (SoC), multiple agents may be coupled to a memory controller which in turn may be coupled to one or more memory devices. The multiple agents may access the memory device(s) via the memory controller. The memory controller may include a memory cache configured to store data for the purposes of reducing the number of requests that access off-chip memory. The memory cache may be shared by multiple agents including one or more processors. The one or more processors may execute an operating system (OS) for controlling the overall operation of the SoC.

The SoC may be coupled to a display, and the SoC may generate the images and video that are shown on the display. The SoC may store the pixel data that makes up the video and images in a frame buffer, and the frame buffer may be stored in the memory device. The pixel data stored in the frame buffer may be used to drive the display at a fixed frame rate. When the OS detects that the frame buffer has not changed for a predetermined period of time, the OS may initiate a sequential allocation mode for storing the frame buffer in the memory cache. Depending on the size of the frame buffer and the size of the memory cache, a portion of the frame buffer or the entire frame buffer may be stored in the memory cache. Therefore, for as long as the content shown on the display is not changing, the frame buffer (or a portion thereof) may reside in the memory cache and may be loaded from the memory cache to be shown on the display. In one embodiment, part of the memory controller or the entire memory controller may be powered down for prolonged periods of time after a portion of or the entire frame buffer is stored in the memory cache.

In one embodiment, the sequential allocation mode may involve allocating the frame buffer in the memory cache on a sequential basis. Pixel data may be stored in sequential indexes within an individual way until the entirety of the way has been filled with pixel data. While pixel data is being stored in this way, all other ways may be put into retention mode to reduce the leakage power that is lost by the memory cache. When the current way has been filled with pixel data, the next way may be put into access mode, and pixel data may be allocated in the next way by moving sequentially through the indexes. The previous way may be put into retention mode once pixel data is being allocated in the next way.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a memory cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a cache with a plurality of cache lines, the terms "first" and "second" cache lines can be used to refer to any two of the plurality of cache lines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
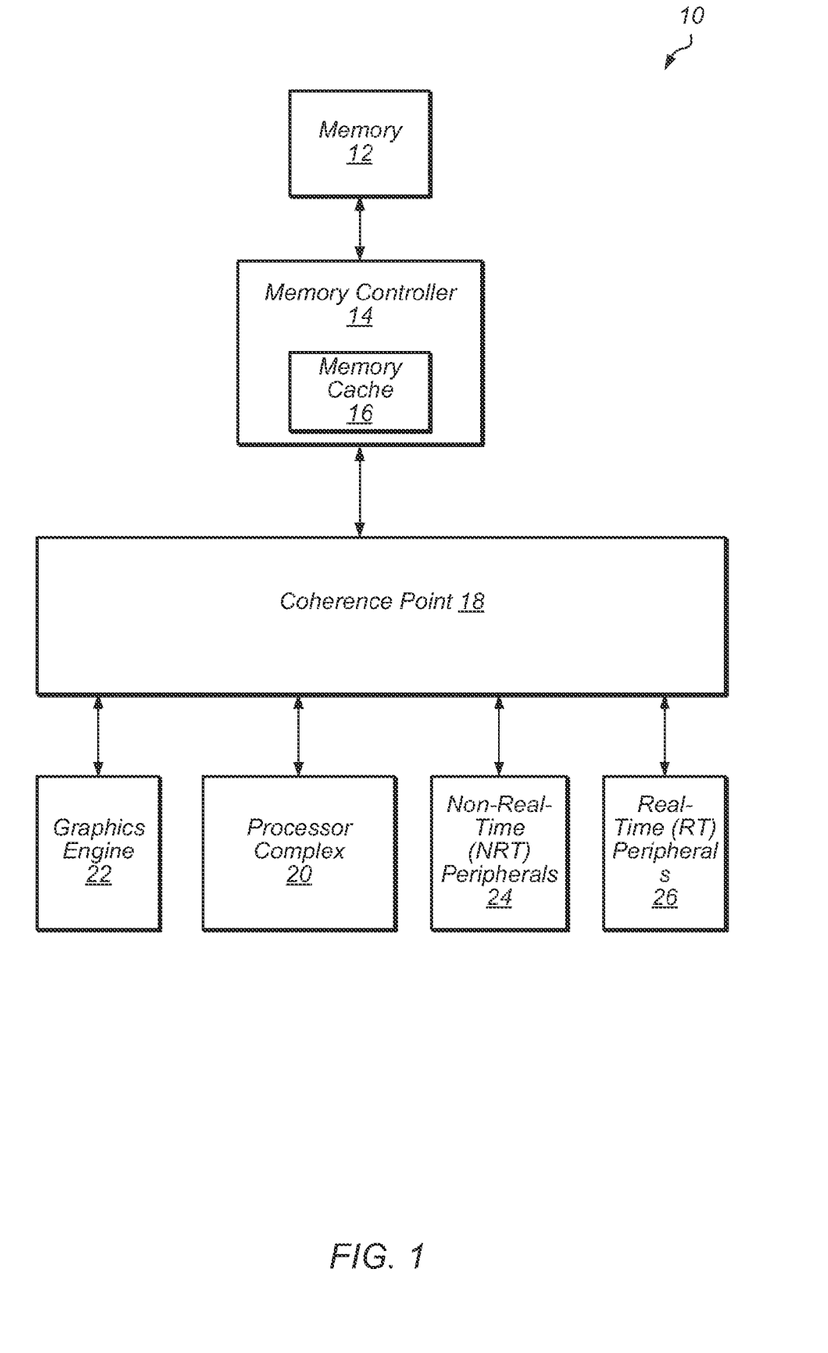
FIG. 1 illustrates one embodiment of a portion of an electronic device.

Referring now to FIG. 1, a block diagram illustrating one embodiment of a portion of an electronic device is shown. In the illustrated embodiment, electronic device 10 includes a memory 12, memory controller 14, coherence point 18, processor complex 20, graphics engine 22, non real-time (NRT) peripherals 24, and real-time (RT) peripherals 26. It is noted that electronic device 10 may also include other components not shown in FIG. 1. Furthermore, in another embodiment, one or more of the components shown in FIG. 1 may be omitted from electronic device 10. In various embodiments, electronic device 10 may also be referred to as an apparatus, mobile device, or computing device.

Memory 12 is representative of any number and type of memory devices, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

Memory controller 14 may include circuitry configured to interface to memory 12, and various components may be coupled to memory controller 14 via coherence point 18. In other embodiments, one or more of the other devices shown in FIG. 1 may be coupled directly to memory controller 14 rather than coupled through coherence point 18. In various embodiments, memory controller 14 may include any number of ports for coupling to various peripherals, components, and/or requesting agents.

Memory controller 14 may include memory cache 16 for storing data retrieved from or intended for memory 12. Memory cache 16 may be configured to process memory requests from multiple requesting agents. One or more requesting agents may be included within any of the devices shown connected to coherence point 18. As a result of allocating data in memory cache 16, the number of accesses that are made to memory 12 may be reduced, which reduces latency of memory requests and power consumption of electronic device 10.

Coherence point 18 may be configured to route coherent and non-coherent traffic to and from memory controller 14. Coherence point 18 may also be referred to as a coherence switch. Although not shown in FIG. 1, coherence point 18 may be coupled to other devices, such as a flash controller, camera, display, and other devices.

Processor complex 20 may include any number of central processing units (CPUs) (not shown) and various other components (e.g., caches, bus interface unit). The CPU(s) of processor complex 20 may include circuitry to run an operating system (OS). In various embodiments, the OS may be any type of OS (e.g., iOS). Each of the CPUs may include a level one (L1) cache (not shown), and each L1 cache may be coupled to a level two (L2) cache. Other embodiments may include additional levels of cache (e.g., level three (L3) cache).

Graphics engine 22 may include any type of graphics processing circuitry. Generally, the graphics engine 22 may be configured to render objects to be displayed into a frame buffer (not shown). The frame buffer may typically reside in memory 12. However, when the display has not changed for a predetermined period of time, then the frame buffer, or at a portion of the frame buffer, may be allocated into memory cache 16. In some embodiments, the length of the predetermined period of time may be on the order of microseconds. The OS or a display driver may detect that the display has not changed using any of a variety of techniques, depending on the embodiment. The techniques may include detecting the absence of user input, detecting no new data being written to the frame buffer by the graphics engine 22, comparing the current frame buffer to the previous frame buffer, or detecting the absence of a relevant amount of memory accesses from other agents than the display controller.

Graphics engine 22 may include graphics processors that execute graphics software to perform a part or all of the graphics operation, and/or hardware acceleration of certain graphics operations. The amount of hardware acceleration and software implementation may vary from embodiment to embodiment. NRT peripherals 24 may include any non-real time peripherals. Various embodiments of the NRT peripherals 24 may include video encoders and decoders, scaler/rotator circuitry, image compression/decompression circuitry, etc. RT peripherals 26 may include any number and type of real-time peripherals.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
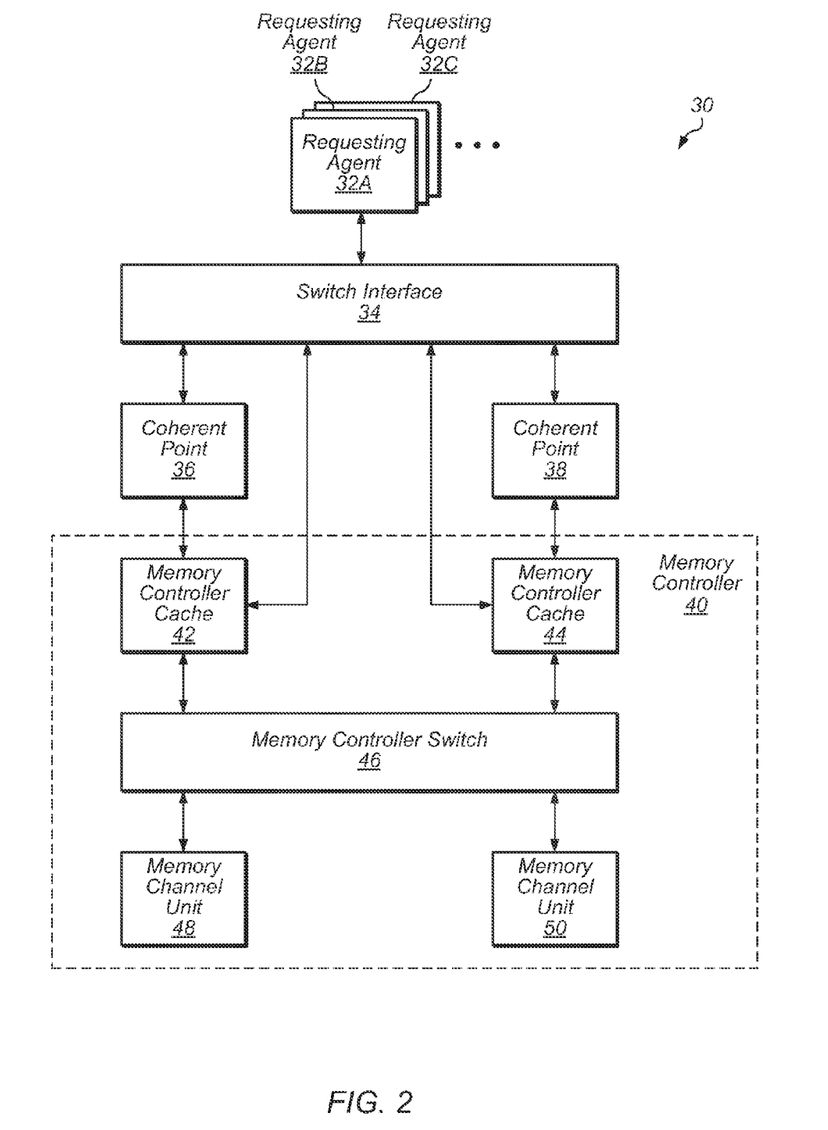
FIG. 2 illustrates one embodiment of a portion of an integrated circuit.

Turning now to FIG. 2, one embodiment of a portion of an integrated circuit is shown. Integrated circuit (IC) 30 may include requesting agents 32A-C, switch interface 34, coherence points 36 and 38, and memory controller 40. Memory controller 40 may include memory controller caches 42 and 44, memory channel switch 46, and memory channel units 48 and 50. Memory controller 40 may be coupled to one or more memory devices (not shown). In various embodiments, IC 30 may be included within any of various types of electronic devices, including mobile, battery-powered devices. IC 30 may also be referred to as a system on chip (SoC). It is noted that IC 30 may include other components and interfaces not shown in FIG. 2.

The requesting agents 32A-C may be configured to perform various operations in the system, and may access memory as part of performing these operations. For example, requesting agents 32 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers). The requesting agents 32 may be physically separate circuitry, such as a separate instance of a processor. Alternatively, a requesting agent may be a logical entity such as a process or thread executing on a processor, such that a single physical processor may include multiple logical requestors. The number of requesting agents 32A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 32A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Coherence points 36 and 38 may be configured to manage the coherency of requests that are conveyed to the memory controller 40 from the requesting agents 32A-C. In one embodiment, traffic from requesting agents 32A-C may be split up in switch interface 34 and traverse a specific coherence point depending on the address that is being targeted by the specific memory request. Other embodiments may include other numbers of coherence points.

Memory controller caches 42 and 44 may be separate physical caches but may be considered a single logical memory controller cache. More specifically, memory controller caches 42 and 44 may share a single address space, and memory requests that reference the address space of cache 42 may be routed by switch interface 34 to cache 42 via coherent point 36 and memory requests that reference the address space of cache 44 may be routed by switch interface 34 to cache 44 via coherent point 38. Switch interface 34 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 42 and 44 may also be referred to as system caches or memory caches. In other embodiments, memory controller 40 may include other numbers of memory controller caches. For example, in another embodiment, memory controller 40 may include four separate memory controller caches.

Memory controller switch 46 may route traffic between memory controller caches 42 and 44 and memory channel units 48 and 50. There may be one memory channel unit 48 and 50 for each memory channel included in a given embodiment, and other embodiments may include one channel or more than two channels. The memory channel units 48 and 50 may be configured to schedule memory operations to be transmitted on the memory channel. The memory channel units 48 and 50 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 48 and 50 may schedule memory operations in bursts of operations. To create bursts of memory operations for scheduling, the memory channel units 48 and 50 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Figure 3:
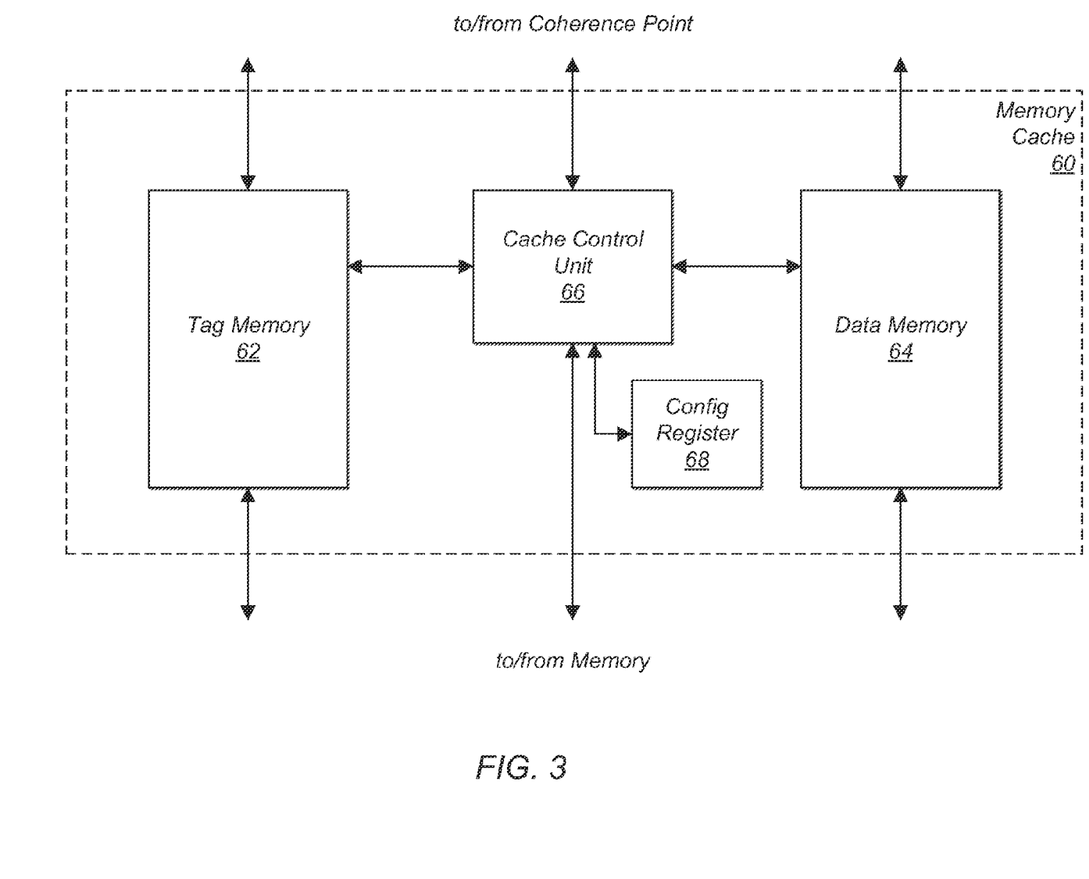
FIG. 3 is a block diagram illustrating one embodiment of a memory cache.

Referring now to FIG. 3, a block diagram of one embodiment of a memory cache is shown. In one embodiment, memory cache 60 may include tag memory 62, data memory 64, cache control unit 66, and configuration register 68. It is noted that memory cache 60 may also include other components and logic not shown in FIG. 3. For example, in other embodiments, memory cache 60 may include arbitration circuitry to arbitrate among requests. It is to be understood that the memory cache architecture shown in FIG. 3 is merely one possible architecture that may be implemented. In other embodiments, other memory cache architectures may be utilized with the methods and mechanisms disclosed herein.

In one embodiment, tag memory 62 may be coupled to receive addresses for memory requests from requesting agents. It is noted that the terms "memory request" and "transaction" may be used interchangeably throughout this disclosure. Data memory 64 may be coupled to receive data or provide data for transactions. In various embodiments, tag memory 62 and data memory 64 may include multiple ways, and each way may be addressable by index. For example, in one embodiment, tag memory 62 and data memory 64 may each include 16 ways. In other embodiments, tag memory 62 and data memory 64 may include other numbers of ways. Cache control unit 66 is coupled to tag memory 62 and data memory 64, and cache control unit 66 may be configured to receive various control data related to the received transactions and to respond to the received control data. It is noted that although cache control unit 66 is shown in FIG. 3 as a single unit, in other embodiments, cache control unit 66 may be split up into multiple units within memory cache 60. Configuration register 68 may include configuration information for the various group IDs associated with the data stored in memory cache 60. Configuration register 68 may be programmed by software commands sent to cache control unit 66 from the OS and/or various requesting agents.

Configuration register 68 is representative of any number of configuration registers which may be utilized as part of memory cache 60. For example, in one embodiment, there may be a separate configuration register 68 for each group identifier (ID) assigned by the OS to use memory cache 60. In this embodiment, each configuration register may define a status, quota, and replacement policy for a respective group ID. The status may be set to either active or inactive by a software command sent to memory cache 60. When the status is set to inactive, this may trigger the cache control unit 66 to invalidate all of the lines that are allocated for this particular group ID. The quota may be set to limit the amount of lines that may be allocated for the respective group ID in memory cache 60. In one embodiment, there may be a quota counter (not shown) for each group ID in the cache control unit 66. The quota counter may keep track of the number of cache lines in memory cache 60 for the corresponding group ID.

Data memory 64 may comprise a set of data entries, each having capacity to store a cache line of data. The cache line may be the unit of allocation and deallocation in data memory 64. The cache line may be any desirable size, such as 32 bytes or 64 bytes, although larger and smaller cache line sizes may be supported in other embodiments. In another embodiment, the cache lines of data memory 64 may be referred to as "cache blocks".

In various embodiments, data memory 64 may utilize any type of memory device. In one embodiment, data memory 64 may comprise a RAM, for example, indexed by entry number. Data memory 64 may be arranged so that a set of cache line storage locations may be selected for read/write operation responsive to an index portion of the input address (e.g., a number of bits of the address that may be decoded to uniquely select a set among the number of implemented sets). The cache line storage location that is to be accessed may be identified by the cache control unit 66 (e.g., responsive to detecting a cache hit for a request, responsive to allocating the cache line storage location to store a missing cache line). Data may be read from the accessed cache line storage location to return to the requestor for a read cache hit, or to transmit to the memory for a cache line evicted from memory cache 60. Data may be written to the accessed cache line storage location for a write cache hit from a requestor or to complete a cache fill of a missing cache line into an allocated cache line storage location. In some embodiments, data memory 64 may be a banked implementation and bank selection control may be provided from the cache control unit 66 as well.

Tag memory 62 may utilize any type of memory device, such as for instance, a RAM. Alternatively, tag memory 62 may comprise a content addressable memory (CAM) for snooping purposes, or a RAM/CAM combination. The tag memory 62 may comprise a plurality of tag entries, each entry selected by a different value of the index mentioned above. The selected tag entry may store the tags that correspond to the set of cache line storage locations in memory cache 60 that are selected by the index. Each tag corresponds to a cache line in the respective cache line storage location, and may include the tag portion of the address of the corresponding cache line (i.e., the address, less the least significant bits that define an offset within the cache line and the bits that are used for the index), and various other state information. In response to a request, the tag memory 62 may be configured to decode the index and output the tags to the cache control unit 66 for processing. In an embodiment, the tag memory 62 may also include tag comparison circuitry configured to compare the tags to the tag portion of the request address, and may provide the comparison results to the cache control unit 66. In another embodiment, the cache control unit 66 may compare the tags. The cache control unit 66 may also be configured to perform various tag updates by writing the tag entry.

Memory cache 60 may have any configuration. In some embodiments, a direct mapped or set associative configuration may be implemented. In typical direct mapped and set associative caches, there is a preconfigured, one-to-one correspondence between tag entries and data entries. In a direct mapped configuration, each address maps to one possible entry (tag memory 62 and data memory 64) in memory cache 60, at which the corresponding cache line would be stored. In one embodiment, memory cache 60 may be associative, in which a given address maps to two or more cache line storage locations in the data memory 64 that may be eligible to store the cache line. Memory cache 60 may be set associative, in which each address maps to two or more possible entries (dependent on the associativity of the cache). In one embodiment, N cache line storage locations are mapped to addresses having the same value in a subset of the address bits referred to as an index, where N is an integer greater than one and less than the total number of cache line storage locations in data memory 64. The N cache line storage locations forming a set corresponding to a given index are often referred to as "ways". Other embodiments may be fully associative, in which any cache line storage location may be mapped to any address.

Cache control unit 66 may dynamically allocate a data entry in data memory 64 to store data for a transaction received by memory cache 60. The transaction may be a write to memory, for example. The transaction may also be a read completion (with data) provided from the memory (not shown) in response to a read previously received from a requesting agent and targeting the memory.

In one embodiment, each transaction received by memory cache 60 from a requesting agent may include a group ID number, a cache allocation hint, and one or more other attributes. The cache allocation hint may be utilized by memory cache 60 and cache control unit 66 to determine how to allocate a cache line for the transaction if the transaction misses in the memory cache 60. If a new cache line is allocated for the transaction, the group ID number may be stored in a corresponding entry in tag memory 62.

Tag memory 62 may be configured to store various tags for the cache lines cached in the memory cache 60. For example, in one embodiment, the tags may include the coherence state, the sticky state, a dirty indicator, least recently used (LRU) data, a group identification (ID), and other data. Depending on the embodiment, some or all of these tags may be included in each entry of tag memory 62.

Figure 4:
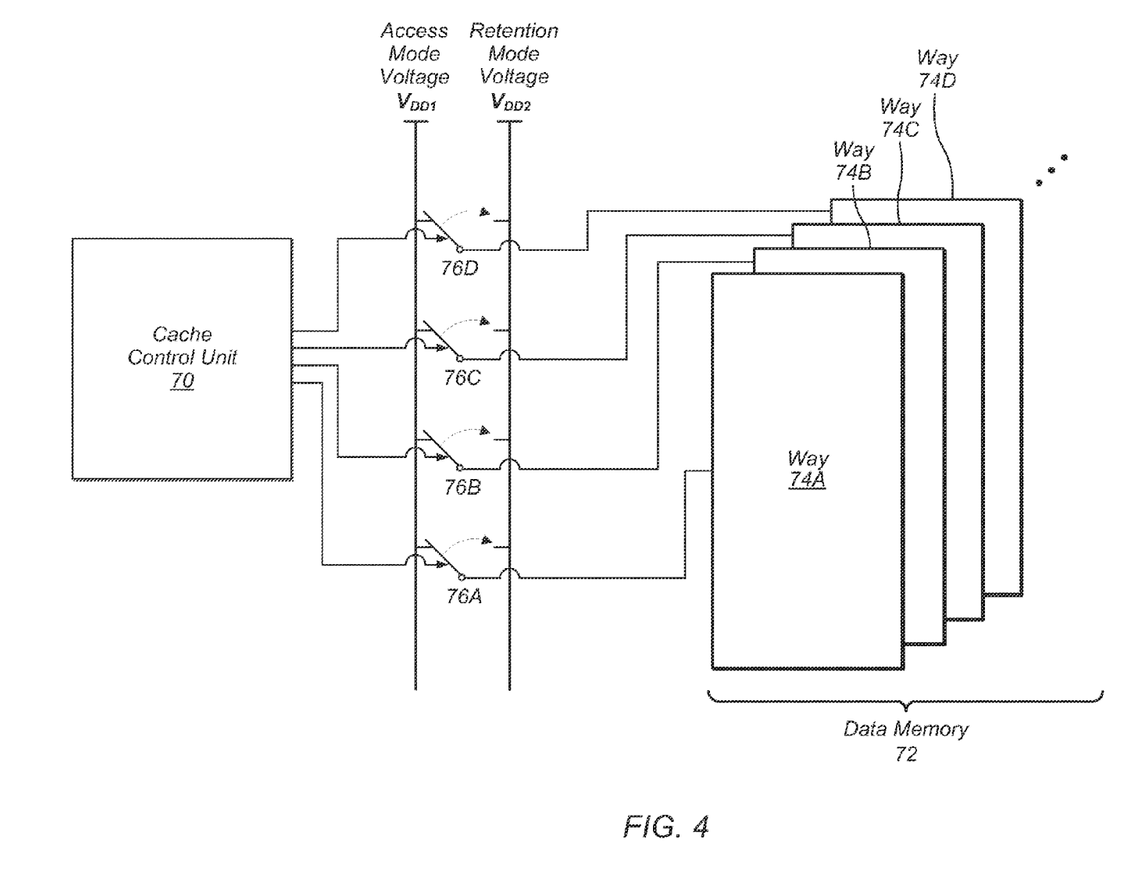
FIG. 4 is a block diagram illustrating one embodiment of the individually powered ways of a data memory.

Turning now to FIG. 4, a block diagram of one embodiment of the ways of a memory cache is shown. Data memory 72 includes ways 74A-D, which are representative of any number of ways of data memory 72. Each way 74A-D may be coupled to two independent power supplies ($V_{DD1}$) and ($V_{DD2}$) via independently controllable switches. In one embodiment, data memory 72 may be a static random-access memory (SRAM). In other embodiments, data memory 72 may be other types of memory.

Switches 76A-D may be controlled by cache control unit 70. The voltage provided to each way may be determined by cache control unit 70 based on whether the specific way is being accessed. If a way is being accessed, the voltage supplied to the way may be the higher supply voltage ($V_{DD1}$) which allows the data in the way to be read or written. If a way is not being accessed, the voltage supplied to the way may be the lower supply voltage ($V_{DD2}$) which allows the data in the way to be retained but does not allow data to be read from or written to the way. In one embodiment, for a specific type of memory cache architecture, ($V_{DD1}$) may be 1.8 volts while ($V_{DD2}$) may be 1.3 volts. In other embodiments, the actual voltage of the two supply voltages ($V_{DD1}$) and ($V_{DD2}$) may vary.

By controlling the power supplied to each way independently, the leakage power lost by the overall memory cache may be significantly reduced. When a given way is being accessed, the supply voltage ($V_{DD1}$) may be higher and so the leakage power may be greater during this time. However, when the given way is no longer being accessed, the supply voltage may be reduced to a retention voltage ($V_{DD2}$) to reduce the leakage power lost. Cache control unit 70 may allow for a grace period to elapse so that the given way has a chance to ramp-up to the higher supply voltage ($V_{DD1}$).

It is noted that in some embodiments, ways may be divided into sections, and each section may be provided with its own supply voltage. In these embodiments, the cache control unit may keep only the section being accessed in access mode, while the other sections may be kept in retention mode.

Figure 5:
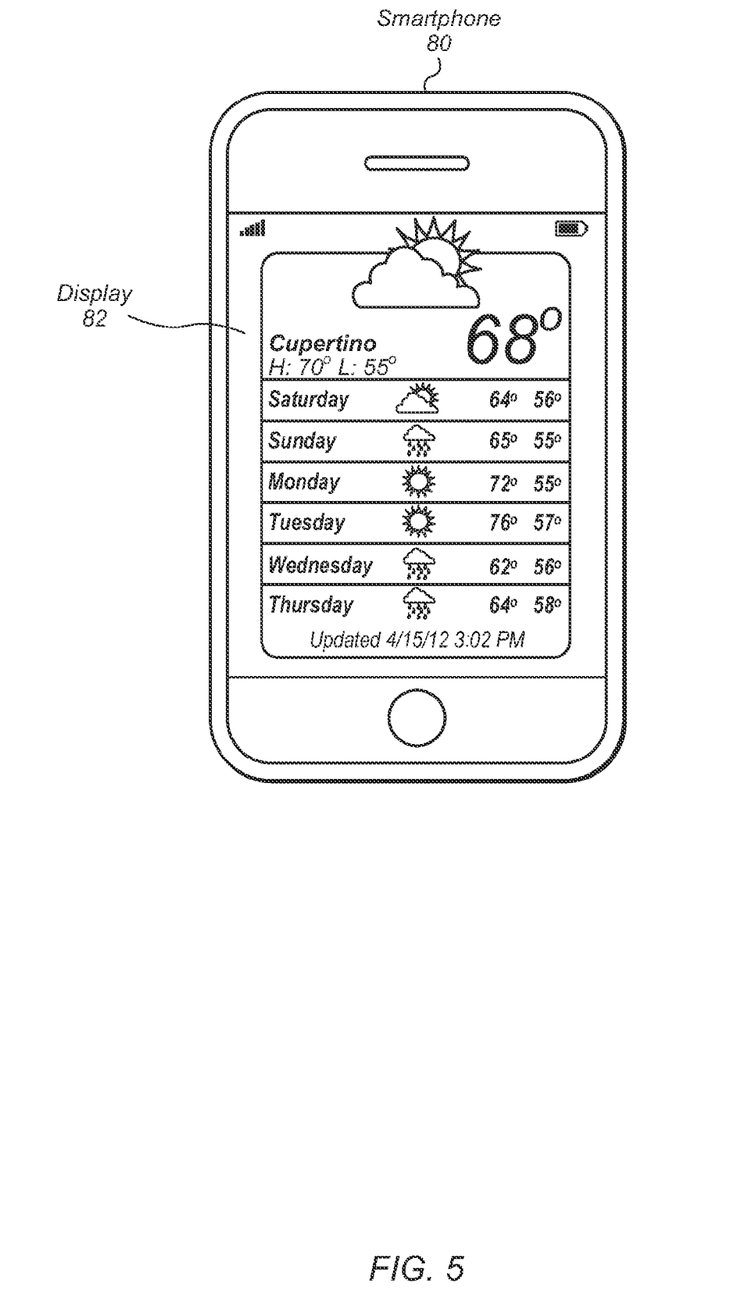
FIG. 5 is a block diagram illustrating one embodiment of a smartphone in idle screen mode.

Referring now to FIG. 5, one embodiment of a smartphone in the idle screen mode is shown. Smartphone 80 is representative of any type of electronic device with a display, such as a phone, tablet, e-reader, or other device. While display 82 is shown with a weather forecast, this is merely one example of the use of smartphone 80. Other types of activities may result in the screen being idle for significant periods of time. These other types of user activities on smartphone 80 that cause the idle screen use case include various types of browsing activities (e.g., reading web pages, viewing images).

In various embodiments, smartphone 80 may include the circuitry shown in FIGS. 1 and 2. Smartphone 80 may also include additional circuitry and components not shown in FIGS. 1 and 2. When a user is actively using smartphone 80, the images and/or video being displayed on the display 82 may be updated at a fixed amount of frames per second. For example, in one embodiment, the display 82 may be updated 60 times per second. During normal operations, while the screen contents are changing, the display 82 may be driven by pixel data stored in a frame buffer in the memory of smartphone 80.

While the frame buffer is stored in memory, the memory cache located in the memory controller may be used to store a variety of data by many different requesting agents, including the processors of the smartphone 80. The memory cache may be organized as a two-dimensional array, with index as one dimension and way as the other dimension. In order to fully utilize the capacity of the memory cache, the OS and cache control unit may attempt to keep the traffic pattern evenly distributed among all of the indexes. The cache control unit may also ensure that the allocation is evenly distributed among all of the ways of the memory cache.

While a user is using smartphone 80 for various activities, including browsing activities, from time to time, the display surface will be static. When the OS of smartphone 80 detects that the image being displayed on the display 82 has not changed for a predetermined length of time, then the OS may initiate the sequential allocation mode in order to store the frame buffer, or at least a portion of the frame buffer, in the memory cache.

Figure 6:
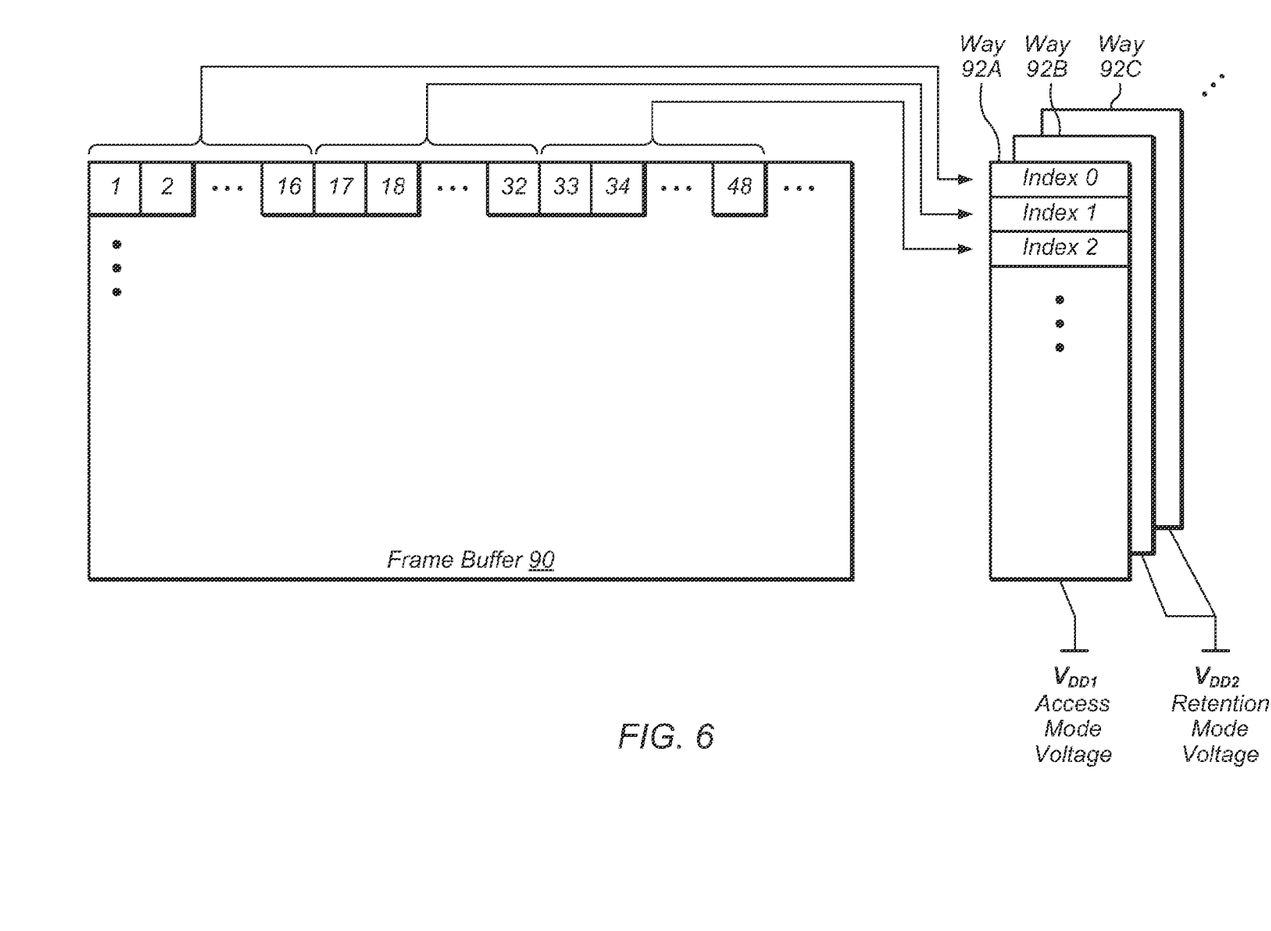
FIG. 6 is a block diagram illustrating one embodiment of a frame buffer being allocated in a sequential manner to a memory cache.

Turning now to FIG. 6, a block diagram of one embodiment of a frame buffer being allocated into a memory cache is shown. Frame buffer 90 is representative of any size of frame buffer with any number of pixels. Frame buffer 90 may be used to drive the display of an electronic device, and frame buffer 90 may typically reside in memory. When the idle screen use case is detected, frame buffer 90 may be allocated into the memory cache using a sequential allocation mode. Ways 92A, B, and C are representative of any number of ways of a memory cache, and these ways may have any number of indexes, depending on the embodiment.

For the example shown in FIG. 6, it may be assumed for the purposes of this discussion that there are 4 bytes of data per pixel and that a cache line is 64 bytes. Therefore, 16 pixels may be stored in each cache line of ways 92A-C. It is noted that the amount of bits per pixel and the size of the cache line may vary depending on the embodiment. The pattern of storing pixels in a sequential fashion in sequential indexes of way 92A is shown for the first three indexes of way 92A. This pattern may continue for the remainder of the indexes of way 92A. While pixels from frame buffer 90 are being allocated to way 92A, way 92A may be kept in access mode while all other ways may be kept in retention mode to reduce the power leakage of the memory cache.

To allocate the pixels of frame buffer 90 in the sequential manner shown in FIG. 6 as a result of the OS detecting the idle screen use case, the cache control unit (not shown) may disable the LRU algorithm for way allocation that is typically used when a request is received and allocated in the memory cache. The cache control unit may also disable any hash functions which are used to generate a traffic pattern that is evenly distributed among all the indexes. Instead, the cache control unit may allocate pixels to the same way until the way has been completely filled with pixel data. Then, the cache control unit may move to the next, adjacent way. As shown in FIG. 6, way 92A, which may also be referred to as way 0, is the first way to be used for allocating the pixel data. It is intended that after way 0 is filled with pixel data, way 1 (way 92B) will be used, then way 2 (way 92C), and so on. Alternatively, in another embodiment, the last way may be filled first, and then ways may be allocated going from highest to lowest. For example, if the memory cache has 16 ways that are numbered 0 to 15, way 15 may be used first, then way 14, then way 13, and so on.

It is noted that the pattern used for allocating frame buffer 90 into the memory cache may also be used when reading frame buffer 90 out of the memory cache. Once the idle screen use case is detected, frame buffer 90 may be allocated into the memory cache the next time frame buffer 90 is fetched from memory to be displayed on the screen. Then, the following time frame buffer 90 is fetched for display, frame buffer 90 may be fetched in a sequential manner from the memory cache. It is noted that in some embodiments, the entire frame buffer 90 may not fit in the memory cache. In these embodiments, all of the pixels which are stored in the memory cache may be fetched from the memory cache in a sequential fashion, and then the remainder of the pixels may be fetched from memory.

FIG. 6 is intended to illustrate the sequential manner of allocating frame buffer 90 to the ways 92A-C of a memory cache. It is to be understood that the example shown is only one possible embodiment, and that other embodiments may vary from the example shown in FIG. 6. For example, although pixels are shown being allocated starting from the top left pixel of frame buffer 90 and moving to the right, it is noted that in other embodiments, other starting points of frame buffer 90 may be utilized.

Figure 7:
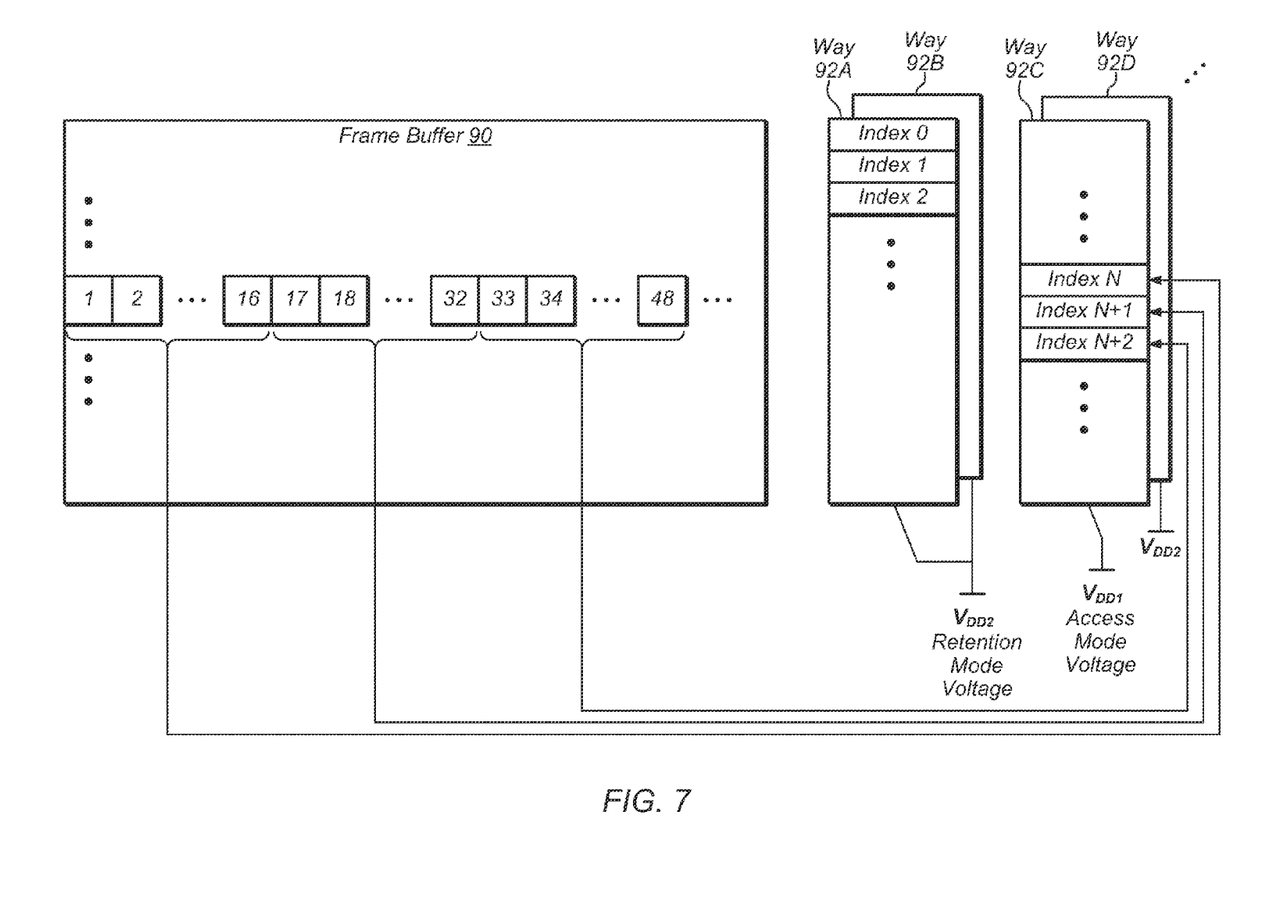
FIG. 7 is a block diagram illustrating another embodiment of a frame buffer being allocated in a sequential manner to a memory cache

Referring now to FIG. 7, another embodiment of allocating a frame buffer to a memory cache is shown. FIG. 7 is a continuation of the example shown in FIG. 6. The pixels of frame buffer 90 may be allocated into sequential indexes of each way of the memory cache. As shown in FIG. 7, the sequential allocation of pixels has moved down several rows into frame buffer 90, and now way 92C is being filled with the pixels as shown in the figure. It may be assumed that ways 92A-B have already been completely filled with pixels from the previous rows of pixels from frame buffer 90.

As is shown in FIG. 7, way 92C is being supplied with the higher voltage ($V_{DD1}$) necessary to put way 92C in access mode. The other ways 92A-B and 92D are supplied with the lower retention voltage ($V_{DD2}$) in order to keep these ways in retention mode. All of the other ways of the memory cache may also be kept in retention mode to reduce the leakage power lost. The process illustrated in FIGS. 6 and 7 may be continued until either all of frame buffer 90 has been written into the ways 92A-D (which are representative of any number of ways) or until the ways 92A-D are completely filled.

Figure 8:
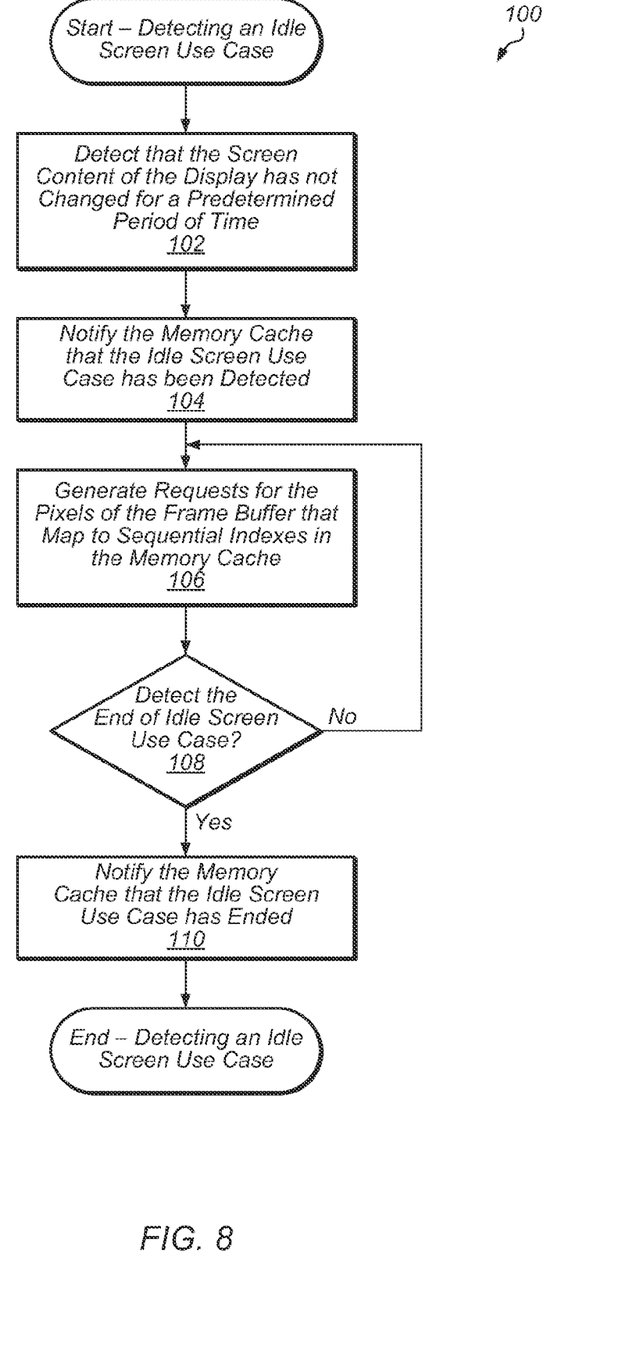
FIG. 8 is a generalized flow diagram illustrating one embodiment of a method for detecting the idle screen mode.

Turning now to FIG. 8, one embodiment of a method 100 for handling an idle screen use case is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, the operating system (OS) of an electronic device may detect that the screen content of the display has not changed for a predetermined period of time (block 102). The length of the predetermined period of time may vary depending on the embodiment. Next, the OS may notify the memory cache that the idle screen use case has been detected (block 104). The memory cache may respond by entering a sequential allocation mode to minimize power consumption during the duration of the idle screen use case.

Then, the OS may generate requests for the pixels of the frame buffer that map to sequential indexes in the memory cache (block 106). In response, the memory cache may allocate the pixels to sequential indexes of the same way until the way has been completely filled with pixels from the frame buffer. The memory cache may move to the next way and allocate pixels to sequential indexes of this way, and then the memory cache may continue this pattern for the remainder of the ways. For subsequent requests for the frame buffer after the frame buffer has been allocated to the memory cache, the memory cache may read the frame buffer out of the ways using the same sequential accesses.

In one embodiment, the OS may store the static frame buffer "as is" (i.e., without modification or compression) in the memory cache. In another embodiment, the OS may use appropriate compression technique(s) to fit more pixels into the memory cache and thus increase the power savings. Various compression techniques may be used, such as blending multiple source frame buffers into a single target frame buffer (e.g., blending a decoded JPEG image with a graphical user interface), reducing the number of bytes used per pixel (e.g., from 8 to 4), omitting the alpha channel information that is not required for the idle screen condition, as well as other techniques.

Next, the OS may determine if the end of the idle screen use case has been detected (conditional block 108). The end of the idle screen use case may be caused by a change in the contents being displayed on the electronic device. If the end of the idle screen use case has been detected (conditional block 108, "yes" leg), then the OS may notify the memory cache (block 110). As a result of receiving this notification, the memory cache may disable sequential allocation mode. The memory cache may allocate other data to the memory cache which will evict the pixels from the frame buffer. After block 110, method 100 may end.

If the end of the idle screen use case has not been detected (conditional block 108, "no" leg), then method 100 may return to block 106 to generate requests for the pixels of the frame buffer that map to sequential indexes of the memory cache. It is noted that the frame buffer may be read from the memory cache a certain number of times per second (e.g., 60 frames per second). Therefore, method 100 may move from conditional block 108 to block 106 a fixed number of times per second as long as the display content has not changed.

Figure 9:
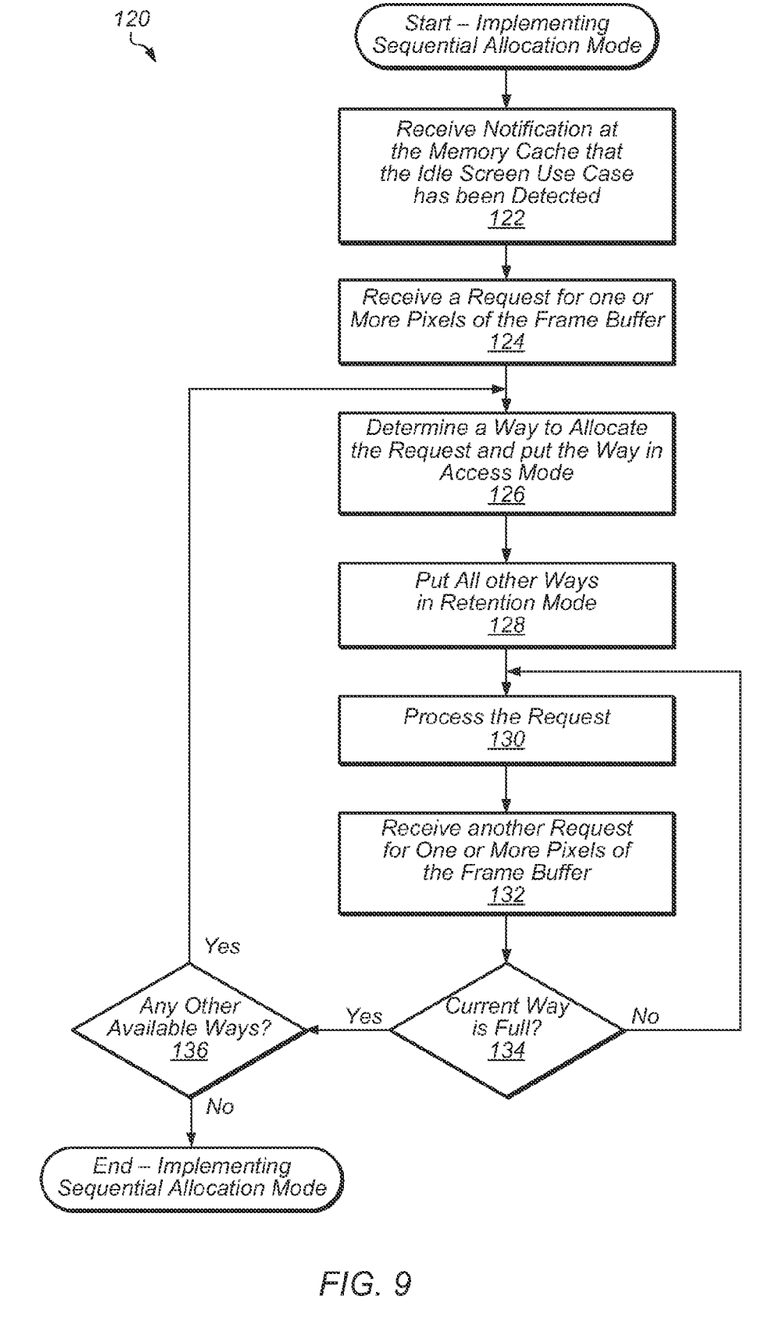
FIG. 9 is a generalized flow diagram illustrating one embodiment of a method for implementing sequential allocation mode.

Referring now to FIG. 9, one embodiment of a method 120 for implementing the sequential allocation mode in a memory cache is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The memory cache may receive a notification of the detection of the idle screen use case by the OS (block 122). The notification may also include an indication of the dataset ID of the display surface associated with the idle screen use case. Next, the memory cache may receive a request for one or more pixels of the frame buffer (block 124). The cache control unit may determine a way into which to allocate the request and then put the chosen way in access mode (block 126). The cache control unit may also put all other ways in retention mode, if these modes were not already in retention mode (block 128). Then, the cache control unit may process the request (block 130).

Next, the memory cache may receive another request for one or more other pixels of the frame buffer (block 132). The cache control unit may determine if the current way has already been fully allocated with pixels from the frame buffer (conditional block 134). If the current way is not full (conditional block 134, "no" leg), then method 120 may return to block 130 to process the request in the current way.

If the current way is full (conditional block 134, "yes" leg), then the cache control unit may determine if there are any other available ways into which to allocate the current request (conditional block 136). If there are no more available ways for storing the current request (conditional block 136, "no" leg), then method 120 may end. If there is at least one more available way for storing the current request (conditional block 136, "yes" leg), then method 120 may return to block 126 to determine in which way to allocate the request. It is noted that in some embodiments, block 126 may be performed prior to receiving the request that will be allocated in the next way. The cache control unit of the memory cache may anticipate the new request based on the location of the previous request. For example, if the last index of a way is targeted on a given request, the cache control unit may anticipate the target of the next request and put the next way in access mode prior to receiving the next request. In this way, the ramp-up time required for a way to go from retention mode to access mode may not actually cause a delay in the next request, since this ramp-up period will elapse prior to receiving a request that will be allocated in the next way.

Figure 10:
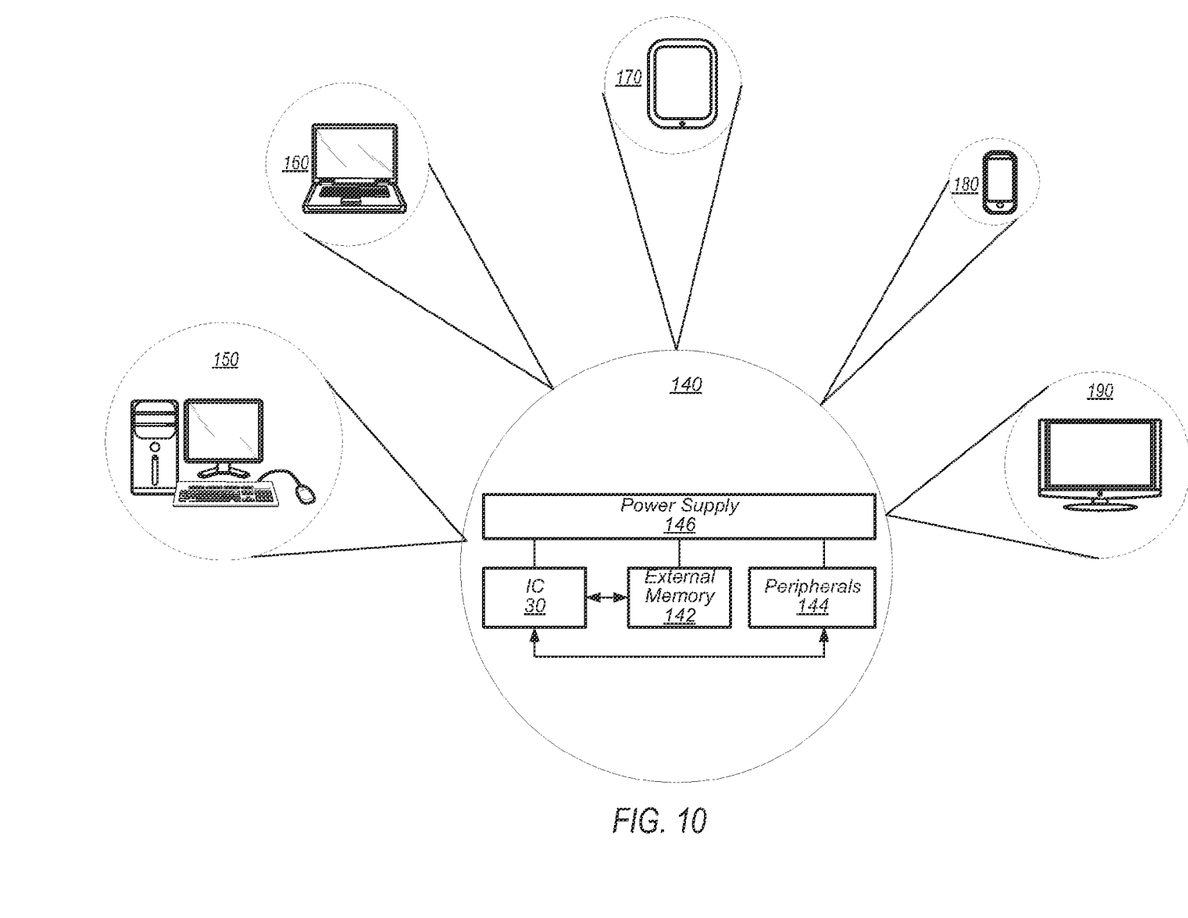
FIG. 10 is a block diagram of one embodiment of a system.

Turning next to FIG. 10, a block diagram of one embodiment of a system 140 is shown. As shown, system 140 may represent chip, circuitry, components, etc., of a desktop computer 150, laptop computer 160, tablet computer 170, cell phone 180, television 190 (or set top box configured to be coupled to a television), or otherwise. Other devices are possible and are contemplated. In the illustrated embodiment, the system 140 includes at least one instance of IC 30 (of FIG. 2) coupled to an external memory 142.

IC 30 is coupled to one or more peripherals 144 and the external memory 142. A power supply 146 is also provided which supplies the supply voltages to IC 30 as well as one or more supply voltages to the memory 142 and/or the peripherals 144. In various embodiments, power supply 146 may represent a battery (e.g., a rechargeable battery in a smart phone, laptop or tablet computer). In some embodiments, more than one instance of IC 30 may be included (and more than one external memory 142 may be included as well).

The memory 142 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 30 in a chip-on-chip configuration, a package-on-package configuration, or a multi-chip module configuration.

The peripherals 144 may include any desired circuitry, depending on the type of system 140. For example, in one embodiment, peripherals 144 may include devices for various types of wireless communication, such as wifi, Bluetooth, cellular, global positioning system, etc. The peripherals 144 may also include additional storage, including RAM storage, solid state storage, or disk storage. The peripherals 144 may include user interface devices such as a display screen, including touch display screens or multitouch display screens, keyboard or other input devices, microphones, speakers, etc.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
   detecting that a display of an electronic device has not changed for a predetermined period of time;
   responsive to said detecting:
      storing a first portion of a frame buffer in a first way of a memory cache, wherein the first portion is associated with a dataset ID, and wherein the memory cache is a multi-way, set associative cache, and wherein the frame buffer comprises pixel data used to drive the display;
      putting all other ways of the memory cache into retention mode while storing the first portion of the frame buffer in the first way;
      allocating a first plurality of requests to the first way in a sequential manner, wherein the first plurality of requests comprise requests that target subsequent indexes of the memory cache;
   putting a second way into access mode and putting the first way into retention mode responsive to storing the first portion of the frame buffer in the first way;
   storing a second portion of the frame buffer in the second way of the memory cache; and
   storing a status for each of a plurality of dataset IDs, a quota for each of the plurality of dataset IDs, and a replacement policy for each of the plurality of dataset IDs;
   setting a quota for the first dataset ID, the quota identifying a limit on an amount of data that may be allocated in the memory cache for the first dataset ID;
   setting said status to active or inactive; and
   invalidating all data stored within the memory cache corresponding to a given dataset ID, responsive to setting a status for the dataset ID to inactive.

2. The method as recited in claim 1, wherein the first and second ways are adjacent ways of the memory cache.

3. The method as recited in claim 1, wherein the first portion of the frame buffer is stored in the first way of the memory cache by sequentially accessing indexes of the first way.

4. The method as recited in claim 1, further comprising continuing storing portions of the frame buffer in other ways of the memory cache until either all portions of the frame buffer have been stored in the memory cache or all ways have been utilized for storing portions of the frame buffer.

5. The method as recited in claim 4, further comprising reading the frame buffer from the memory cache a fixed number of times per second while the display is not changing, wherein the frame buffer is read from the memory cache in a sequential manner.

6. The method as recited in claim 1, further comprising assigning the first dataset identifier (ID) to the frame buffer.

7. The method as recited in claim 1, wherein said status is set to active or inactive by a command.

8. A cache comprising:
   a cache memory comprising a plurality of ways, wherein each way of the plurality of ways has a separately controllable power supply; and
   a cache control unit, wherein the cache control unit is configured to:
      receive an indication that a display has not changed for a predetermined period of time, wherein the display is associated with a first dataset identifier (ID), wherein responsive to receiving said indication the cache control unit is configured to:
  put a first way into access mode responsive to receiving a first request with the first dataset ID, wherein the first request targets a first index;
  allocate the first request to the first way;
  put all other ways of the cache memory into retention mode; and
  allocate a first plurality of requests to the first way in a sequential manner, wherein the first plurality of requests comprise requests that target subsequent indexes of the cache memory;
a configuration register configured to store a status for each of a plurality of dataset IDs, a quota for each of the plurality of dataset IDs, and a replacement policy for each of the plurality of dataset IDs;
wherein the cache control unit is further configured to:
  set a quota for the first dataset ID, the quota identifying a limit on an amount of data that may be allocated in the cache memory for the first dataset ID;
  set said status to active or inactive; and
  invalidate all data stored within the cache memory corresponding to a given dataset ID, responsive to setting a status for the dataset ID to inactive.

9. The cache as recited in claim 8, wherein the cache control unit is further configured to disable a least recently used (LRU) algorithm for way allocation responsive to receiving the indication that the display has not changed for a predetermined period of time.

10. The cache as recited in claim 9, wherein the cache control unit is further configured to put a second way into access mode and put the first way into retention mode responsive to receiving a second request with the first dataset ID targeting the first index.

11. The cache as recited in claim 10, wherein the cache control unit is further configured to allocate the second request to the first index of the second way.

12. The cache as recited in claim 11, wherein the cache control unit is further configured to put a third way into access mode and put the second way into retention mode responsive to receiving a third request with the first dataset ID targeting the first index.

13. The cache as recited in claim 8, wherein said status is set to active or inactive by a software command.

14. The cache as recited in claim 13, wherein the cache control unit is further configured to enter a sequential allocation mode responsive to idle screen detection.

15. A system comprising:
a display;
one or more processors;
a cache comprising a plurality of ways, wherein each way of the plurality of ways has a separately controllable power supply, wherein the cache is configured to:
  store a status for each of a plurality of dataset IDs, a quota for each of the plurality of dataset IDs, and a replacement policy for each of the plurality of dataset IDs;
  set a quota for a first dataset ID, the quota identifying a limit on an amount of data that may be allocated in the cache for the first dataset ID; and
  invalidate all data stored within the cache corresponding to a given dataset ID, responsive to setting a status for the given dataset ID to inactive;
a memory;
wherein responsive to detecting a frame buffer has not changed for a predetermined period of time:
  put a first way into access mode responsive to receiving a first request with the first dataset ID, wherein the first request targets a first index;
  allocate the first request to the first way;
  put all other ways of the cache into retention mode; and
  allocate a first plurality of requests to the first way in a sequential manner, wherein the first plurality of requests comprise requests that target subsequent indexes of the cache.

16. The system as recited in claim 15, wherein the cache comprises a plurality of ways, and wherein the cache is configured to allocate at least a portion of the frame buffer in a sequential manner, starting with a first index of the first way and proceeding through subsequent indexes of the first way, and continuing through all other ways of the cache.

17. The system as recited in claim 15, wherein the cache comprises:
a data memory configured to store a plurality of cache lines, wherein the data memory comprises a plurality of ways;
a tag memory configured to store a plurality of tags corresponding to the plurality of cache lines in the data memory; and
a control unit configured to:
  cause each way that is not being accessed to be supplied with a first voltage, wherein the first voltage is sufficient for data retention; and
  cause the first voltage to be increased to a second voltage for a given way, responsive to determining the given way is being accessed.

18. The system as recited in claim 15, further comprising a quota counter associated with the first dataset ID, wherein the quota counter indicates an amount of data stored in the data memory that corresponds to the first dataset ID.

19. The system as recited in claim 15, wherein all pixel data of the frame buffer is stored in the cache.

20. The system as recited in claim 15, wherein the one or more processors are configured to store data in the cache prior to at least a portion of the frame buffer being stored in the cache.

* * * * *